United States Patent [19]

Massel

[11] Patent Number: 5,090,528

[45] Date of Patent: Feb. 25, 1992

[54] TORQUE CONVERTER TO DRIVELINE COUPLER FOR DRAG-TYPE RACING

[75] Inventor: Bruno H. Massel, Bensenville, Ill.

[73] Assignee: Bruno's Automotive Products, Inc., Bensenville, Ill.

[21] Appl. No.: 661,436

[22] Filed: Feb. 25, 1991

[51] Int. Cl.$^5$ .............................................. F16D 33/00
[52] U.S. Cl. .................... 192/3.34; 192/85 R
[58] Field of Search .................. 192/3.34, 3.23, 85 R

[56] References Cited

U.S. PATENT DOCUMENTS 3,507,371  4/1970  Richard et al. .................. 192/3.34

FOREIGN PATENT DOCUMENTS 1780593  7/1970  Fed. Rep. of Germany ..... 192/3.34
892314   3/1962  United Kingdom ............... 192/3.34

OTHER PUBLICATIONS

"Super Stock and Drag Illustrated", Nov. 1990.

*Primary Examiner*—Leslie A. Braun
*Assistant Examiner*—Andrea Pitts
*Attorney, Agent, or Firm*—McAndrews, Held & Malloy, Ltd.

[57] ABSTRACT

A coupler is disclosed to allow a torque converter mounted to an engine to drive a transmission or other driveline component that is not constructed for use with a torque converter. The coupler includes a pump to provide fluid to the torque converter under pressure and an externally adjustable fluid pressure regulator to vary the pressure of the fluid provided to the torque converter. The stall speed of the torque converter has been found to change as the fluid pressure is changed. A fast-release driveline brake in the coupler provides reliable restraint of the coupler shaft which functions as the output shaft of the torque converter and allows power to be quickly applied to the attached driveline component.

15 Claims, 4 Drawing Sheets

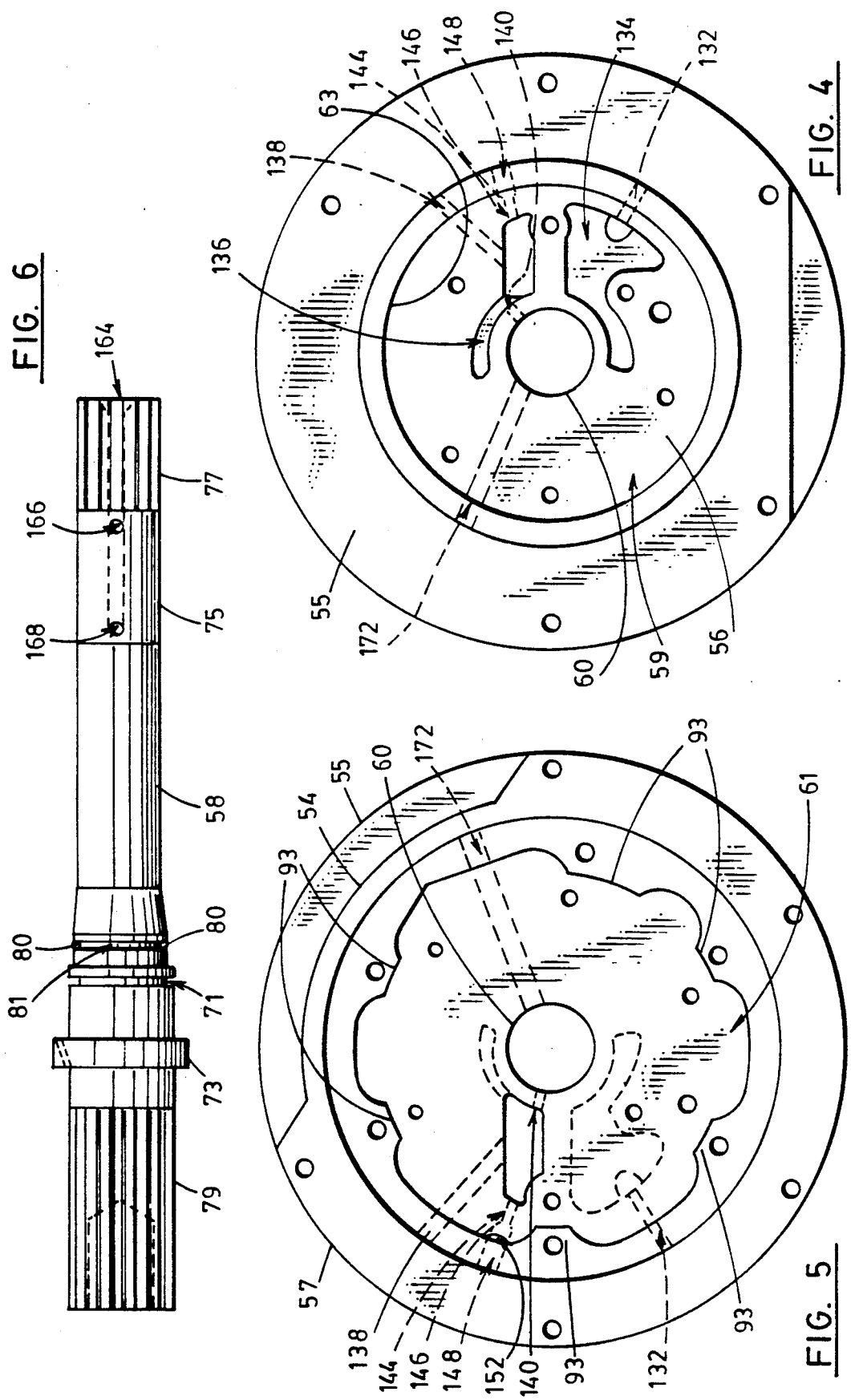

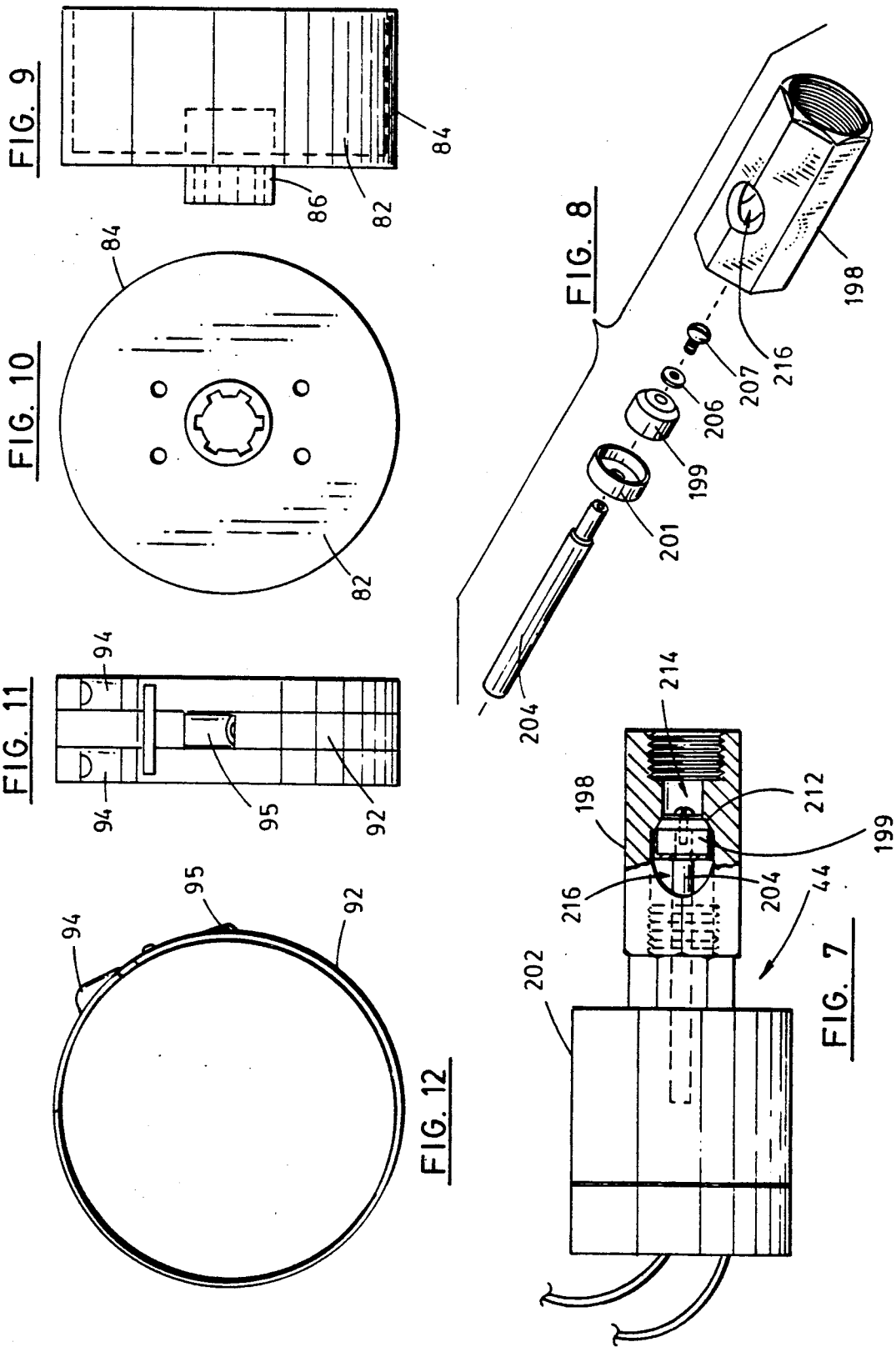

TORQUE CONVERTER TO DRIVELINE COUPLER FOR DRAG-TYPE RACING

The present invention relates to a device for coupling a torque converter to a driveline of an automobile constructed for drag-type racing, and more particularly, to a coupler providing a fast-release driveline brake and a means for externally adjusting the stall speed of the torque converter.

BACKGROUND OF THE INVENTION

Racing is known to severely load driveline components, including transmissions, drive shafts, differentials, and axles, of competing automobiles. In particular, drag-type racing, including all racing in which the competing automobiles accelerate at or near the automobile's maximum capacity during some or all of the race, imposes exceptionally severe loads on the drivelines. In this type of racing, maintaining the maximum acceleration the automobile can achieve and beginning to accelerate within an extremely short time is critical to success. To maintain maximum acceleration, the automobile's engine must be operated at or near its maximum power and that power must be continuously transmitted through the automobile's driveline.

Various types of racing automobiles having engines generating a range of horsepower from several hundred horsepower to several thousand horsepower compete in drag-type racing. The driveline components used with the various types of automobiles are adapted to transmit the power expected to be generated by the particular type of engine used by the automobile and for the particular type of race. A racing automobile having a high horsepower engine and competing in a short race requires an extremely strong driveline and may not require a transmission while an automobile with a lower horsepower engine does not require as strong a driveline and may use a two, three, or four speed transmission. Transmissions used in drag-type racing must reliably change gear ratios with a minimum interruption in power transmitted through the driveline. The combined requirements of transmitting high loads and minimum interruption of power during gear changes restrict the types of transmissions that can be used in drag-type racing.

Engines conventionally used in automobiles that compete in drag-type races generate their maximum power when operating at relatively high speeds. The engine must be disengaged from the driveline for the car to remain at a complete stop and the engine operate at or near its highest power. Clutches or fluid coupling torque converters mounted to the engine are used to apply power to a stopped or slowly rotating driveline from an engine operating at a high speed. The performance of the clutch or torque converter is critical to the performance of an automobile competing in drag-type racing, particularly at the start of the race.

Automobiles having engines producing the highest horsepower naturally require the strongest driveline components. Additionally, drivelines used with the highest horsepower engines must provide for adjustment of the rate at which power is applied through the driveline. This adjustment is conventionally provided through use of an adjustable clutch. Adjustable clutches having a significant range of adjustment are used in the highest horsepower cars for drag racing where it is critical that tires not be allowed to slip on the track surface. An adjustable clutch applies torque from an engine rotating at a high speed to a stationary or slowly moving output shaft by frictional sliding of plates within the clutch. The torque that is applied to the output shaft depends on the frictional characteristics of the clutch which may change due to clutch surface conditions, temperature, wear and other factors.

Automatic transmissions manufactured to be coupled with a torque converter in passengers cars were modified and adapted to be coupled to adjustable clutches in high horsepower racing automobiles at least twenty years ago. Breakage was a significant problem despite the use of strengthened transmission components. As high horsepower engines developed increased horsepower, these modified transmissions were found not to be able to withstand the higher horsepower. Transmissions are now manufactured specifically for use in the higher horsepower acceleration type racing. These transmissions have extremely strong gears, shafts and other components to withstand the severe loads. Planetary gear transmissions, such as those manufactured by Lenco, Inc. are now commonly used in drag-type racing by cars using the highest horsepower engines. Because these transmissions are made specifically for use with higher horsepower engines, they are conventionally used with an adjustable clutch.

Automobiles constructed for drag-type racing having lower horsepower engines conventionally use automatic transmissions to increase the mechanical advantage of the engine and provide reliable gear changes. These automatic transmissions are typically transmissions that were originally manufactured for use in a passenger automobile and that have been modified by replacing production parts with strengthened components. Automatic transmissions modified for lower horsepower racing are now typically coupled to the engine by a torque converter, similar to those used with the transmission in passenger automobiles. These racing torque converters are designed to operate with transmission fluid supplied from the transmission pump that provides fluid to operate the automatic transmission. Several manufacturers have developed torque converters that enhance the performance of automobiles using various automatic transmissions for drag-type racing. Automatic transmissions manufactured for conventional automobiles that are strengthened and modified for racing are significantly less expensive than racing transmissions that are manufactured for use with the highest horsepower engines.

Drag racing by lower horsepower automobiles often requires that competing automobiles finish the race in a time that is not less than a specified time. Automobiles engaging in that type of racing are positioned at a starting line and begin the race when a signal is given. Because the time in which the automobile may complete the race can be no less than a specified time, beginning the race quickly becomes extremely critical. Reaction of both the driver to the start signal and the automobile to the driver are critical.

Torque converters are recognized as best suited for racing in which applying power to the drive train in the shortest possible time is critical and in which a large range of driveline adjustment is not required. The output shaft of a torque converter may be stopped while the throttle of the engine to which the torque converter is connected is fully open. The output shaft may be stopped by applying the automobile's brakes or otherwise restraining driveline motion. A racing torque converter having the output shaft stopped will not allow the engine to rotate faster than a "stall speed." At the stall speed, the engine applies a torque through the torque converter to the stopped output shaft of the torque converter. That torque is determined by the power of the engine at the stall speed and the characteristics of the torque converter. Upon disengagement of the output shaft restraint, torque applied to the driveline by the torque converter accelerates the automobile. Power is quickly and predictably applied to the driveline when the output shaft restraint is released.

As now used in racing automobiles, torque converter characteristics are not adjustable. To change stall speed or other torque converter characteristics, the torque converter must be replaced. Difficulty in adjusting torque converters may impair an automobile's performance by precluding adjustments that may optimize the automobile's performance. This difficulty is generally considered to be outweighed by the advantages offered by a torque converter for racing automobiles having lower horsepower engines. The weight of such automobiles and the availability of tires providing increased traction to prevent slipping make these racing automobiles require less driveline adjustment than higher power racing automobiles. For racing automobiles using lower horsepower engines, the advantages of reliable and responsive performance offered by a torque converter outweigh the limitation on adjustment.

Despite the use of strengthened driveline components, the physical restrictions of the original design of an automatic transmission limit the modifications that can be made to withstand racing loads. Similar to the experience in racing automobiles using higher horsepower engines, racing automobiles that now typically use modified automatic transmissions are producing greater horsepower and the number of races that the modified automatic transmission can withstand before failure of the transmission can be very small. A race may be lost as a result of transmission failure. If the failure does not cause the racing automobile to lose the race, the transmission must be repaired or replaced before the automobile can race again. As a result, the automatic transmission of a racing automobile competing in an event consisting of a series of elimination races may be replaced several times during the event. The cost of using modified automatic transmissions is increased proportionally to the number of transmissions required.

The need therefore exists for a torque converter driven transmission that will withstand the severe loads imposed by drag-type racing. In addition, the need also exists to provide for convenient adjustment of the torque transmission characteristics of torque converters installed in racing automobiles. In drag racing, in particular, a reliable fast-release brake is required for a torque converter driven driveline to provide reliable restraint of the driveline before the race begins and the fastest possible release of the driveline to begin racing.

SUMMARY OF THE INVENTION

In accordance with the present invention, the disadvantages of transmissions and drivelines used for drag-type automobile racing as discussed above, have been overcome. A coupler is provided which allows use of a conventional racing torque converter with a transmission which is designed and constructed to withstand the severe loadings imposed during drag-type automobile racing. The present invention may further include a means for external adjustment of the stall speed of the torque converter. A reliable fast-release brake that restrains and quickly releases the output shaft of the torque converter is also within the scope of the present invention.

More particularly, the torque converter to driveline coupler of the present invention includes a fluid pump that is adapted to provide transmission fluid under pressure to a conventional racing torque converter that is mounted to the engine of an automobile constructed for drag-type racing. The coupler further provides a coupler shaft that is driven by the torque converter and to which a transmission or other driveline component that is not adapted for use with a torque converter may be engaged.

Additionally, a fast-release brake is provided having a brake drum mounted to the coupler shaft, a resilient external brake band positioned to closely surround the brake drum and adapted to engage the housing of the coupler and to engage the brake drum when an actuator rod extends from an actuating cylinder as a pressure is applied to the actuating cylinder. The actuating cylinder retracts the actuating rod when pressure is released from the cylinder. Because the brake band is closely adjacent to the brake drum, the actuating rod need extend only a very short distance to bring the entire brake band into compete contact with the brake drum and need only retract that short distance to allow the resilient band to disengage from the brake drum. This brake is particularly well suited to provide reliable restraint of the brake drum and shaft and a very quick disengagement on release of pressure from the actuating cylinder.

The pressure supply system providing pressure to the actuating cylinder includes a pressure supply and valves to apply and release pressure from the actuating cylinder. A pressure supply valve between a pressure supply and the actuating cylinder opens to allow and closes to prevent pressure application to the actuating cylinder. A pressure relief valve closes to prevent pressure from releasing from the actuating cylinder and opens to allow pressure release from the cylinder. The system acts to extend the actuator rod by simultaneously opening the pressure supply valve and closing the pressure relief valve. The system allows the actuating cylinder to retract the actuator rod by simultaneously closing the pressure supply valve and opening the pressure relief valve.

Further, the present invention provides for adjustment of the pressure of the transmission fluid supplied to the torque converter. The stall speed of a torque converter has been found to vary as a consequence of a change of pressure of the transmission fluid supplied to the torque converter. An externally adjustable regulator spring seat adjusts the pressure at which the fluid may escape from the passage providing fluid to the torque converter effectively regulating the pressure of the transmission fluid supplied to the torque converter. The adjustable spring seat is moved to increase or decrease the transmission fluid pressure from outside the coupler without disassembly of any driveline component.

Accordingly, an object of the present invention is to couple a conventional racing torque converter to a transmission that is constructed for use with a clutch, to withstand severe loads generated during drag-type racing, and to change gears quickly and reliably.

Another object of the present invention is to provide a coupler for a torque converter and high strength racing transmission that supplies transmission fluid under pressure to the torque converter.

Yet another object of the present invention is to provide a coupler for a torque converter and high strength racing transmission that includes a fast-release brake that restrains the output shaft of the torque converter when the brake is engaged and quickly releases the output shaft when disengaged.

A further object of the present invention is to provide for adjustment of the stall speed of a torque converter without disassembly of the driveline or any structure immediately surrounding the torque converter.

Yet another object of the present invention is to provide a compact, modular, and easily disassembled and serviced coupler for a torque converter and high strength racing transmission.

These and other objects and advantages of the present invention, as well as details of the preferred embodiment thereof, will be more fully understood from the following description and the drawings.

BRIEF DESCRIPTION OF THE DRAWINGS

FIG. 4 is a front view of the main housing of the coupler of the present invention.

FIG. 5 is a rear view of the main housing of the coupler of the present invention.

FIG. 6 is a side view of the coupler shaft of the present invention.

FIG. 7 is a side partial-section view of the pressure relief valve of the present invention.

FIG. 8 is an exploded view of the valve head, vent and valve seat section of the relief valve of the present invention.

FIG. 9 is a side view of the brake drum of the present invention.

FIG. 10 is a rear view of the brake drum of the present invention.

FIG. 11 is a side view of the brake band of the present invention.

FIG. 12 is a rear view of the brake band of the present invention.

DESCRIPTION OF THE PREFERRED EMBODIMENT

Figure 1:
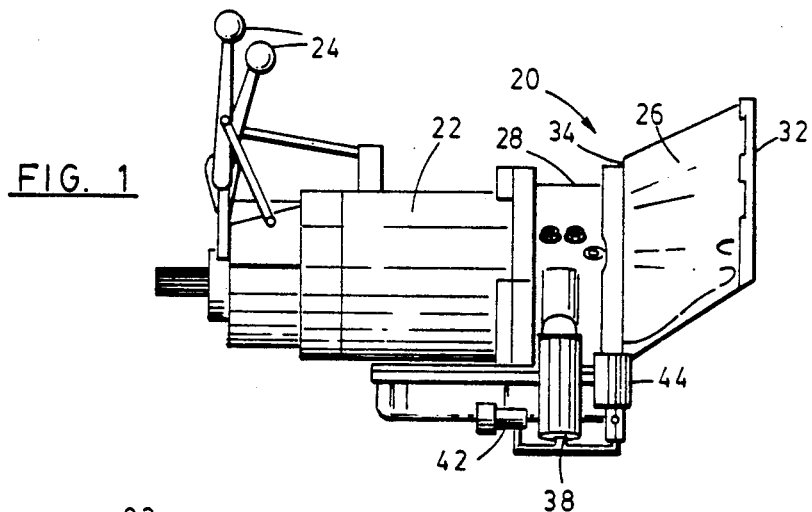
FIG. 1 is a side view of the coupler assembly of the present invention mounted to a racing transmission.

Coupler assembly 20 of the present invention, as illustrated by FIG. 1, is mounted to a racing transmission 22. Coupler assembly 20 is constructed to be driven by a torque converter and to drive the transmission 22 that is not constructed to be coupled to a torque converter. Transmission shift levers 24 mounted at the rear of the transmission 22 actuate the mechanisms in the transmission 22 that change gear ratios. The coupler unit 20 consists of bell housing 26 that mounts to an engine at engine mounting surface 32 and coupler 28 that is mounted to the bell housing 26 at coupler mounting surface 34. The coupler 28 is constructed to be driven by a torque converter mounted to the engine, to drive the transmission 22, and to control the performance of the torque converter as described below. Coupler 28 includes a fast-release brake that engages to prevent coupler 28 from driving transmission 22 and prevent any component of transmission 22 that is driven by and rigidly engaged to coupler 28 from being be driven. The fast-release brake quickly disengages allowing coupler 28 and transmission 22 to be driven by the torque converter. FIG. 1 illustrates brake actuating cylinder 38, pressure supply valve 42 and pressure relief valve 44 of the fast-release brake.

Figure 2:
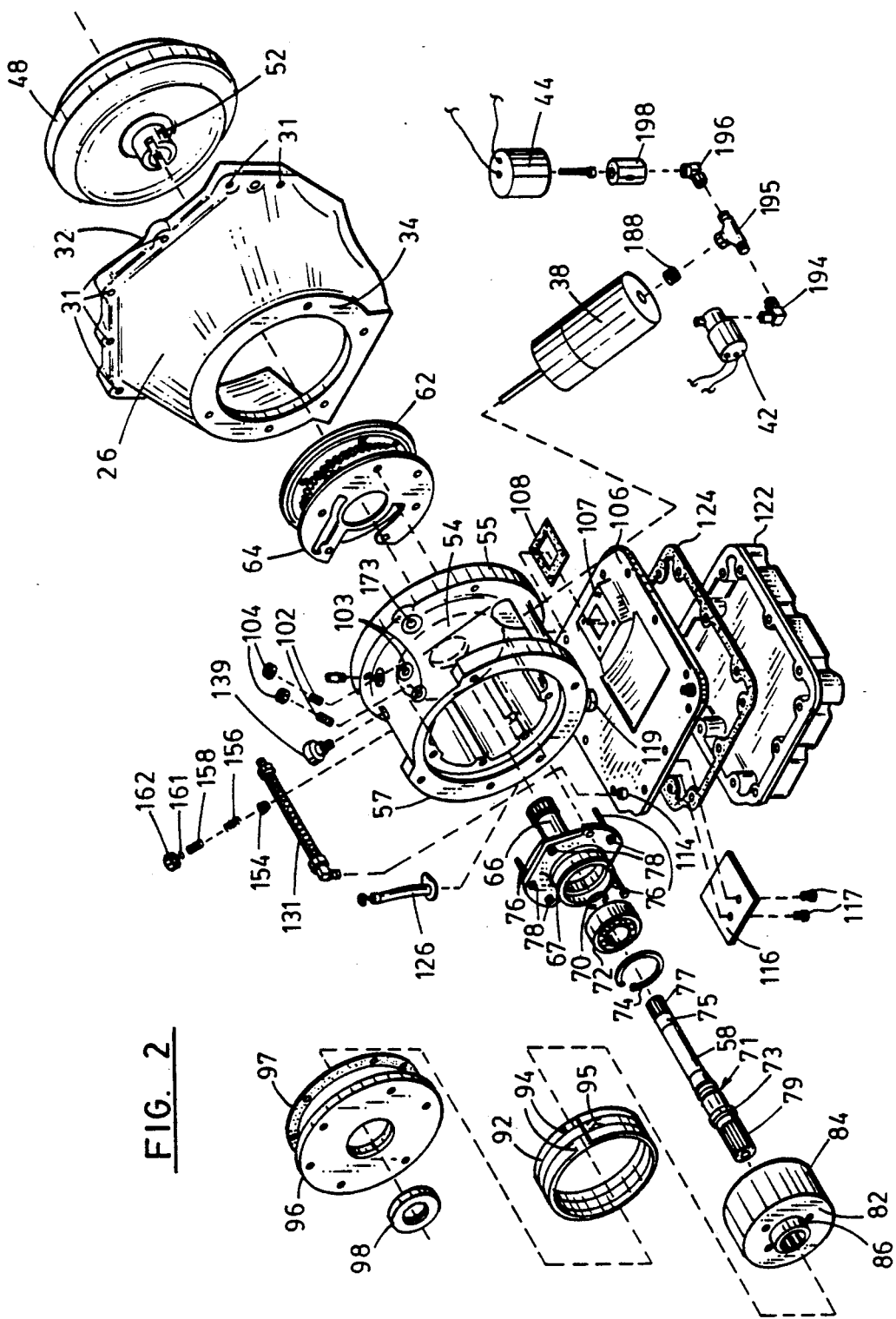
FIG. 2 is an exploded view of the coupler assembly of the present invention and a racing torque converter.

FIG. 2 illustrates the components of coupler assembly 20 and a torque converter 48. The torque converter 48 is adapted to be mounted to and driven by an engine (not shown) in a conventional manner. The bell housing 26 is mounted to the engine at engine mounting surface 32 by bolts that extend through engine mounting holes 31 to engage the engine. The coupler 28 is mounted to the bell housing 26 at coupler mounting surface 34. The bell housing 26 is sized to generally surround the torque converter 48 in a spaced apart relation and to position the coupler 28 in fixed relation to the torque converter 48 to provide for engagement of the torque converter 48 as described below. The torque converter 48 includes a fluid pump drive section 52 that engages and drives fluid pump 62.

A main housing 54 of the coupler 28 has a bell housing flange 55 adapted to mount to bell housing 26 at the coupler mounting surface 34 and a transmission flange 57 adapted to mount to a transmission as illustrated in FIG. 1. As shown in FIGS. 2, 4, and 5, the main housing 54 defines a generally cylindrical interior separated by a stator support partition 56 into a pump chamber 59 opening adjacent to the bell housing flange 55 and a brake chamber 61 opening adjacent to the transmission flange 57. The fluid pump 62 mounts within the pump chamber 59. Replaceable wear plate 64 is positioned within the pump chamber 59 between the stator support partition 56 and the fluid pump 62 protecting the stator support partition 56 against wear from the operation of the fluid pump 62. As presently preferred, the fluid pump 62 is the type manufactured for use in an automatic transmission sold by General Motors Corp. and designated TH325-4L. The fluid pump 62 is positioned within the pump chamber 59 to be driven by the fluid pump drive section 52 as it would be driven in the transmission for which it is designed.

Stator support 66 is mounted to the stator support partition 56 by stator support flange 67 overlying the stator support partition 56 in the brake chamber 61. The stator support 66 is a conventional unit manufactured for use in an automatic transmission sold by General Motors Corp. and designated TH325-4L, with the exception that the stator support 66 has been modified by securing internal threaded blind nuts 78 within the stator support flange 67 as shown by FIG. 2. Stator support studs 76 engage blind nuts 78 and extend through mounting holes in the stator support partition 56, replaceable wear plate 64, and fluid pump 62 as indicated in FIG. 2. Nuts (not shown) are threaded over ends of studs 76 extending away from the stator support partition 56 through the fluid pump 62 securing the stator support 66, replaceable wear plate 64, and fluid pump 62 to the stator support partition 56. Alternatively, bolts may be inserted through the fluid pump 62, wear plate 64, and stator support partition 56 to engage blind nuts 78 in place of studs 76 and nuts adjacent to the fluid pump 62. Either method allows the fluid pump 62 and wear plate 64 to be removed from the coupler 28 entirely by access through the pump chamber 59. The stator support 66 is centrally located within stator support partition 56 by a slight press fit in a central bore 60 of stator support partition 56 to accurately position the stator support 66 with respect to the main housing 54.

The fluid pump 62 provides transmission fluid under pressure to the torque converter 48 and the stator support 66 supports a stationary structure within the torque converter 48. The fluid pump 62 and stator support 66 function within the coupler 28 of the present invention as they function in the conventional transmission for which they are built. As will be recognized by those skilled in the art, the fluid pump 62 and stator support 66 are not power transmitting components in the coupler of the present invention or in the transmission in which they are conventionally used. Use of these conventional components does not compromise the power transmitting capacity of coupler 28.

Coupler shaft 58 is the power transmitting component of coupler 28. The coupler shaft 58 is rotationally driven about a central shaft axis extending along its length and is primarily supported by coupler shaft support bearing 72. The coupler shaft support bearing 72 is a ball bearing that is secured against bearing collar 73 of the coupler shaft 58 by shaft bearing retainer ring 70. The shaft bearing retainer ring 70 engages the coupler shaft 58 in shaft retainer ring groove 71. The coupler shaft 58 extends through stator support 66 positioning the support bearing 72 within the stator support flange 67. Flange bearing retainer ring 74 engages the stator support flange 67 to secure the support bearing 72 within the stator support flange 67. Coupler shaft 58 extends through stator support 66 extending shaft input spline 77 beyond stator support 66 to engage the torque converter 48. Coupler shaft 58 thereby acts as an output shaft for the torque converter 48. Shaft front bearing journal 75 of the coupler shaft 58 is positioned within the stator support 66 adjacent to a bushing secured within the stator support 66. The stator support 66 thereby supports the coupler shaft 58 adjacent to the shaft input spline 77. Stator support seal 80 is positioned in stator support seal groove 81 providing a seal between the coupler shaft 58 and stator support 66 at that location. It is presently preferred that the coupler shaft 58 be manufactured from VASCO steel.

Brake drum 82 mounts to shaft output spline 79 of coupler shaft 58 and is thereby fixed to rotate with the coupler shaft 58. Brake drum 82 has a cylindrical brake surface 84 that is concentric with the central shaft axis of the coupler shaft 58. Brake drum 82 further has a seal surface 86 that is concentric with the central shaft axis of coupler shaft 58 and extends along the shaft output spline as shown in FIGS. 2 and 9. It is presently preferred that the brake drum 82 be manufactured from type 8620 heat treated steel.

Figure 3:
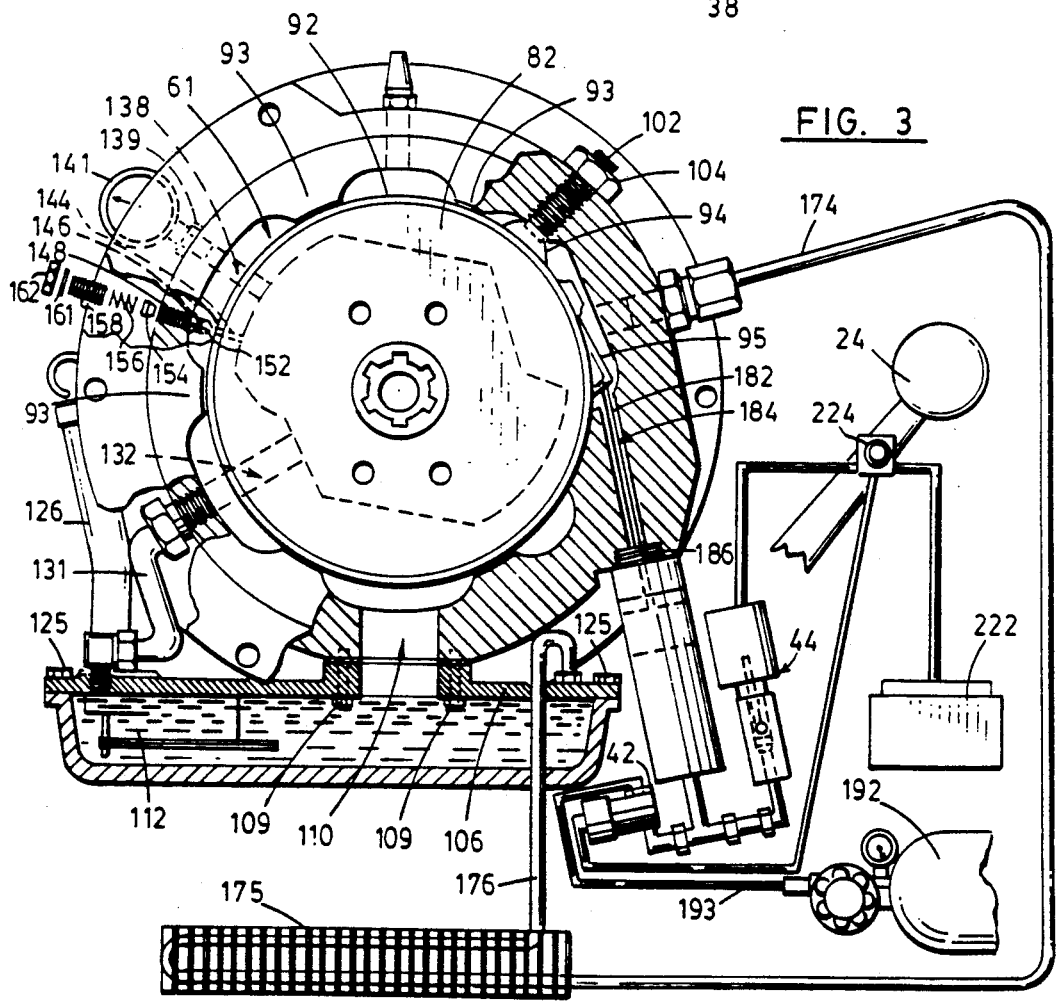
FIG. 3 is a rear partial-section view of the coupler of the present invention and transmission cooler, air pressure supply, and brake actuation controls.

Brake band 92 is a resilient brake band that closely conforms the brake surface 84 and resiliently expands outwardly. It is presently preferred that brake band 92 be a double wrap brake band manufactured for use in the reverse unit of an automatic transmission manufactured by General Motors Corp. and designated TH400. As best shown by FIGS. 3 and 5, band locating ribs 93 of the main housing 54 position the brake band 92 closely adjacent to the brake surface 84. Two brake band set screws 102 prevent the brake band 92 from rotating within the brake chamber 61. The brake band set screws 102 are ⅝- 18 thread set screws that engage and extend through the main housing 54 at band set screw mounting holes 103. The brake band set screws 102 engage brake band stop bosses 94 as best illustrated by FIG. 3. Band set screw jam nuts 104 are threaded over a section of the band set screws 102 extending outwardly from the main housing 54 and tightened against the main housing 54 to prevent movement of the set screws 102.

Coupler rear cover 96 is positioned against the main housing 54 within and flush with transmission flange 57 covering the brake chamber 6;. Coupler rear cover gasket 97 between the rear cover 96 and the main housing 54 assures that brake chamber 61 is sealed. The rear cover 96 is secured to the main housing 54 by flat headed mounting screws (not shown) extending through counter sunk holes in the rear cover 96 allowing a transmission 22 to be mounted flush with coupler 28 as illustrated by FIG. 1.

The main housing 54 has a sump drain 110 extending through the bottom of the main housing 54 from the brake chamber 61. Generally flat sump cover 106 has a flat mounting surface 107 in an upper surface surrounding an opening sized to match sump drain 110. A sump cover gasket 108 conforms to the mounting surface 107. Sump cover mounting bolts 109 extend through holes in the mounting surface 107 and engage the main housing 54 as shown by FIG. 3. Sump cover 106 has a fluid pickup boss 112 which forms an internal pick-up passage extending from a pick-up connection opening 114 in the sump cover 106 to a fluid inlet. Fluid pick-up filter 116 covers the fluid inlet and is secured to the fluid pickup boss 112 by filter mounting screws 117. The sump cover 106 also has a cooler return connection opening 118 and dipstick opening 119.

Fluid pan 122 seats against fluid pan gasket 124 at the outer edge of sump cover !06 and is secured by fluid pan bolts 125 extending through sump cover 106 into threaded holes in fluid pan 122. Dipstick assembly 126 is mounted to the dipstick opening 119 providing conventional access to the fluid pan to measure the level of fluid in the fluid pan 122 and to allow fluid to be introduced into the fluid pan 122. As presently preferred, the main housing 54, sump cover 106, and fluid pan 122 are cast of a material known in the art as "Tenzalloy" that is similar to a material conforming to ASTM specification ZC81A.

The fluid pump 62, stator support 66, and coupler shaft 58 cooperate to provide fluid to and accept fluid from the torque converter 48. Those components function in the standard way that they would function in the transmission in which the fluid pump 62 and stator support 66 are conventionally used. The pump chamber 59 is sized to centrally locate the fluid pump 62 in the main housing 54. The outer edge of the fluid pump 62 closely conforms to pump chamber side surface 63 and the fluid pump 62 entirely overlies the surface of the stator support 56 adjacent to the pump chamber 59. The main housing 54 provides fluid passages and cavities through which the fluid pump 62 draws fluid from the fluid pan 122, through which the fluid pump 62 provides fluid to the torque converter 48 under pressure, and through which fluid returning from the torque converter 48 leaves coupler 28, as described below. In addition to providing these passages for conventional torque converter fluid supply, an externally adjustable fluid pressure regulator is provided to vary the pressure of fluid supplied to the torque converter 48 as described below.

As illustrated in FIGS. 3, 4, and 5, a pump inlet passage 132 extends through the outer surface of the main housing 54 into an inlet cavity !34 extending into the stator support partition 56 from the pump chamber 59. Fluid pump inlet line 131 connects to the pickup connection opening 114 and the opening of pump inlet passage 132 in the outer surface of the main housing 54 providing a fluid path from fluid pan 122 through fluid pickup filter 116 to inlet cavity 134. The fluid pump 62 draws fluid from inlet cavity 134.

The fluid pump 62 provides fluid to the torque converter 48 under pressure through a passage that includes outlet cavity 136 formed in stator support partition 56 from the pump chamber 59. Fluid is directed to the torque converter 48 through fluid supply passage 140 extending from an opening into outlet cavity 136 to an opening into central bore 60. Fluid then enters the torque converter 48 by passing between an outer surface of stator support 66 and an interior surface of fluid pump drive section 52. As shown by FIGS. 4 and 5, a portion of outlet cavity 136 extends through the stator support partition 56. The stator support flange 67 overlies the portion of the outlet cavity 136 that extends through the stator support partition 56 and seals the outlet cavity 136 from the brake chamber 61. A converter fluid pressure gage passage 138 extends from an opening in the outer surface of the main housing 54 to open into outlet cavity 136. As shown by FIGS. 2 and 3 a gage fitting 139 engages the gage passage 138 at the outer surface of the main housing 54 and converter fluid pressure gage 141 engages the gage fitting 139.

A regulator passage 144 extends from an opening into the outlet cavity 136 to a valve seat 146. Valve seat 146 is a regular surface that continuously opens from the regulator passage 144 to regulator valve bore 148 that has a larger cross section than the regulator passage 144. Regulator valve bore 148 extends from the regulator valve seat 146 to an opening in the outer surface of the main housing 54. The regulator valve bore 148 is internally threaded adjacent to the opening in the outer surface of the main housing 54. Relief passage 152 opens into brake chamber 61 and extends to an opening in the regulator valve bore 148.

Regulator valve head 154 is sized to be guided along the regulator valve bore 148, allow fluid to pass between the regulator valve head 154 and the regulator valve bore 148, and to conform to the regulator valve seat 146 sealing the regulator passage 144 from the regulator valve bore 148 by contact with the regulator valve seat 146. The regulator spring 156 is positioned within the regulator valve bore 148 contacting the regulator valve head 154 and extending toward the outer surface of the main housing 54. Regulator spring seat 158 is externally threaded to engage the threads in the regulator valve bore 148 and contacts an end of the regulator spring 156 opposite the regulator valve head 154 when positioned within the threaded section of the valve bore 148. The regulator spring seat 158 has a hex shaped cavity in an end opposite the regulator spring 156 into which a hex wrench may be inserted to rotate and move the spring seat 158 toward or away from the regulator valve seat 146. The regulator valve spring 156 is sized to urge regulator valve head 154 against regulator valve seat 146 with a force that will equal the force exerted on the regulator valve head 154 by a fluid pressure of 55 pounds per square inch in the regulator passage 144 with the regulator spring seat 158 advanced partially into the threaded section of the regulator valve bore 148. The regulator valve bore is threaded to an extent that will allow the regulator spring seat 158 to advance toward valve seat 146 to a position that will increase the force exerted on the regulator valve head 154. The regulator valve bore 148 is also threaded to an extent that will allow the regulator spring seat 158 to be moved away from regulator valve seat 146 to a position that will decrease the force exerted on the regulator valve head 154. The regulator spring seat 158 is sized to extend beyond the outer surface of the main housing 54. An O-ring 161 surrounds the regulator spring seat 158 adjacent to the outer surface of the main housing 54 and a regulator jam nut 162 is threaded over the section of regulator spring seat 158 extending outwardly from the outer surface of the main housing 54. The regulator jam nut 162 is tightened against the outer surface of the main housing 54 compressing the O-ring 161 preventing fluid from leaking around the spring seat 158 and preventing movement of the spring seat 158 within the valve bore 148.

Fluid returns from the torque converter 48 between the coupler shaft 58 and the stator support 66. As shown by FIG. 6, the coupler shaft 58 has a fluid return passage 164 extending along the axis of the coupler shaft 58 from an end adjacent to the inlet spline 77 to approximately the extent of the front bearing journal 75. A shaft side fluid inlet 166 extends through the bearing journal 75 adjacent to the inlet spline 77 to open into the fluid return passage 164. A shaft fluid outlet 168 extends through the bearing journal 75 at approximately the extent of the bearing journal opposite the input spline 75. The bushing within the stator support 66 is positioned between the side fluid inlet 166 and the fluid outlet 168 preventing fluid from flowing along the bearing journal 75. Fluid returning from the torque converter 48 enters fluid return passage 164 through the opening in the end of the coupler shaft 58 and through side fluid inlet 166. Fluid exits fluid return passage 164 through fluid outlet 168 and flows between coupler shaft 58 and stator support 66 to a stator support seal 80 adjacent to the stator support partition 56 where it is exits through the stator support 66 and enters the fluid outlet passage 172. The fluid outlet passage 172 opens into the central bore 160 and extends to a fluid outlet opening 173 in the main housing 54.

A cooler inlet line 174 is connected to fluid outlet opening 173 to direct fluid returning from the torque converter 48 to a standard transmission cooler 175. Fluid that has been heated by circulation within the torque converter 48 is cooled by transmission cooler 175 and returned to the fluid pan 122 by cooler return line 176 connected to the transmission cooler 175 and cooler return connection opening 118. Fluid is added to the coupler 28 through the dipstick assembly 126. The coupler requires approximately four quarts of fluid depending on the size of the transmission cooler used and the length of lines 174 and 176. The fluid level should be maintained approximately as shown by FIG. 3. Transmission fluid recommended for use with the torque converter 48 should be used.

The brake band 84 contracts against the brake drum 82 when brake actuating rod 182 is extended from brake actuating cylinder 38 against band engagement boss 95. A force of 1400 pounds exerted actuating rod 182 against band engagement boss 95 has been found to prevent rotation of brake drum 82 and coupler shaft 58. The brake actuating cylinder 38 is mounted to the main housing 54 at an internally threaded actuating cylinder mounting 186. Actuating rod bore 184 extends through the main housing 54 from actuating cylinder mounting 186 to open into the brake chamber 61 adjacent to the band engagement boss 95. The brake actuating cylinder 38 is sized to exert a 1400 pound force against the actuating rod 182 upon application of air pressure of 200 pounds per square inch to cylinder pressure connection 188. The brake actuating cylinder 38 includes a return spring that exerts a retracting force on brake actuating rod 182 of 30 to 50 pounds. When pressure is removed from pressure connection 188 the return spring retracts the actuating rod 182. The brake actuating rod 182 is sized to be positioned approximately ⅜ of an inch away from engagement boss 95 when fully retracted. Upon contacting of engagement boss 95, brake actuating rod only need extend a further 0.05 inches to cause the brake band 92 to engage the brake drum 82.

Air pressure is supplied to brake actuating cylinder 38 from air bottle 192. As shown by FIG. 3, pressure supply line 193 connects air bottle 192 to pressure supply valve 42. Pressure supply valve 42 is a 250 lb. normally closed electrical solenoid valve. An outlet of pressure supply valve 42 is connected to elbow 194, which is in turn connected to Tee 195 which is connected to the actuating cylinder pressure connection 188 and elbow 196. Elbow 196 is connected to pressure relief vent and seat 198.

As shown in FIG. 7, pressure relief valve 44 consists of vent and valve seat 198, valve head 199, made of polytetrafluoroethylene sold under the trademark "TEFLON" of E. I. de Pont de Nemours, Inc. valve head support 201, and electric solenoid 202. Electric solenoid 202 includes actuating rod 204 which is normally retracted. Solenoid 202 is a 72 lb. 12 volt electric solenoid. Upon activation, electric solenoid 202 extends solenoid actuating rod 204 toward vent and valve seat 198. As illustrated by FIG. 8, valve head support 201 and valve head 199 are secured to the end of actuating rod 204 by washer 206 and mounting screw 207. The valve head support 201 restrains the relatively soft valve head 199 from spreading outwardly.

As illustrated by FIG. 7, actuating rod 204 extends the valve head 199 into sealing position against valve seat 212 of vent and valve seat 198. Vent inlet passage 214 of vent and valve 198 is sized to exert a force of 40 lbs. against valve head 199 seated against valve seat 212 when a pressure of 200 lbs. per square inch is applied through passage 214. When solenoid 202 is deactivated, valve head 199 is retracted away from valve seat 212 opening passage 214 to side vent passages 216 which are open to the atmosphere.

As illustrated by FIG. 3, pressure applied to brake actuating cylinder 38 may be controlled by activation of pressure supply valve 42 and pressure relief valve 44. A 12 volt power source 222 is connected to an activating switch 224, mounted to a transmission shift lever 24. Pressure supply valve 42 is normally closed preventing pressurized air from air bottle 192 from entering actuating cylinder 38 and pressure relief valve 44 is normally open allowing pressure to be released from brake actuating cylinder 38. Switch 224 is constructed to simultaneously activate the solenoids of both pressure supply valve 42 and pressure relief valve 44. Upon activation, pressure supply valve 42 is opened allowing air pressurized to 200 lbs. per square inch to enter brake actuating cylinder 38 and solenoid 202 extends valve head 199 against valve seat 212 preventing release of pressure from actuating cylinder 38. Application of air pressurized to 200 lbs. per square inch extends brake actuating rod 182 causing brake band 92 to engage brake drum 82 preventing rotation of coupler shaft 58. Upon release of switch 224, pressure supply valve 42 returns to its normally closed position preventing pressurized air from air bottle 192 from entering at brake actuating cylinder 38, and pressure relief valve 44 returns to its normally open position retracting valve head 199 away from valve seat 212 allowing pressure within brake actuating cylinder 38 to be vented through vents 216. The return spring of brake actuating cylinder 38 retracts brake actuating rod 182 releasing brake band 92 from brake drum 82 and allowing coupler shaft 58 to rotate.

Modifications and variations of the present invention are possible in light of the above teachings. Thus, it is to be understood that, within the scope of the appended claims, the invention may be practiced other than as described above.

What is claimed and desired to be secured by letters patent is:

1. A coupler for a torque converter comprising:
   a main housing defining a pump chamber;
   a coupler shaft extending through the pump chamber having a torque converter engagement section extending away from the main housing adjacent to the pump chamber;
   a fluid pump within the pump chamber that engages and is driven by the torque converter when the torque converter engages the torque converter engagement section of the coupler shaft and that supplies fluid under pressure to the torque converter through a torque converter fluid supply passage; and
   a torque converter fluid pressure regulator that communicates with the fluid supply passage and allows fluid to flow from the fluid supply passage to a low pressure fluid reservoir in response to pressure in the fluid supply passage and that is adjusted from outside the main housing to increase or decrease the pressure of the fluid at which fluid is allowed to flow to the reservoir
   whereby the pressure of fluid supplied to the torque converter is adjusted from outside the main housing and the stall speed of the torque converter is thereby adjusted without disassembly of the main housing or any structure surrounding the torque converter.

2. The coupler for a torque converter of claim 1 wherein the torque converter fluid pressure regulator comprises:
   a regulator passage extending from the converter fluid supply passage to a regulator valve seat;
   a regulator valve bore extending from the regulator valve seat to a regulator adjustment opening in an outer surface of the main housing;
   a regulator relief passage extending from the valve bore to the low pressure fluid reservoir;
   a regulator valve head sized to move along the regulator valve bore, to seat against the regulator valve seat substantially sealing the regulator passage from the regulator relief passage, and to allow fluid to flow from the regulator passage to the regulator relief passage when displaced from the regulator valve seat along the regulator valve bore;
   a regulator spring positioned against the regulator valve head and extending along the regulator valve bore toward the regulator adjustment opening in the outer surface to a seat end; and
   a regulator spring seat that engages the regulator valve bore and is constructed to be selectively positioned within the regulator valve bore through the regulator adjustment opening to contact the seat end of the regulator spring compressing the regulator spring and urging the regulator valve head against the regulator valve seat under a force determined by position of the regulator valve seat along the regulator valve bore;

whereby the fluid pressure required to move the regulator valve head from the regulator valve seat allowing fluid to flow from the converter fluid supply passage to the regulator relief passage is adjusted by selectively positioning the regulator spring seat within the regulator valve bore through the regulator adjustment opening.

3. The coupler of claim 2 wherein the regulator valve bore is circular in cross section and is threaded, and the regulator spring seat is generally cylindrical with a circular cross section and is sized and threaded to engage the threads of the valve bore and an end surface of the regulator spring seat opposite the regulator spring is formed to engage an adjustment tool constructed to rotate the regulator spring seat in the regulator valve bore, whereby the regulator spring seat is positioned along the regulator valve bore by rotation of the regulator spring seat by the adjustment tool.

4. The coupler of claim 3 wherein the threaded regulator spring seat extends through the adjustment opening and a jam nut is threaded over the threaded section of the regulator spring seat extending from the adjustment opening, whereby the jam nut is advanced to contact the outer surface of the main housing adjacent to the adjustment opening preventing undesired motion of the valve seat.

5. The coupler of claim 2 further comprising:
a brake chamber defined by the main housing, the coupler shaft extending through the brake chamber;
a driveline engagement section of the coupler shaft extending away from the brake chamber;
a fast-release brake within the brake chamber having a brake drum rotatively affixed to the coupler shaft with a brake surface concentric with the coupler shaft and a resilient external brake band surrounding and closely spaced away from the brake surface that circumferentially contracts engaging the brake surface on application of a force directed generally tangentially to the brake surface to an actuator engagement section of the brake band and is rotatively fixed to the main housing preventing rotation of the brake band in a rotational drive direction;
a brake actuating cylinder mounted to the main housing adjacent to the brake band having an actuator rod extending from the actuating cylinder and engaging the actuator engagement section of the brake band and a pressure connection, the actuating cylinder constructed to extend the actuator rod responsive to pressure applied to the pressure connection and retract the rod responsive to removal of pressure from the pressure connection; and
a pressure supply system having a pressure supply, a pressure supply valve in a pressure supply line connecting the pressure supply and the pressure connection, a pressure relief valve in a relief line connecting the pressure connection and a low pressure reservoir
whereby simultaneously opening the pressure supply valve and closing the pressure relief valve providing pressure actuating cylinder causes the brake band to engage the brake drum preventing the coupler shaft from rotating, and the brake band is released by closing the pressure supply valve and opening the pressure relief valve allowing pressure within the cylinder to vent to the low pressure reservoir and the actuator rod to retract.

6. The coupler of claim 5 wherein the pressure supply provides pressurized air.

7. The coupler of claim 6 wherein the pressure supply valve is a normally closed electrically activated solenoid valve and the pressure relief valve is a normally open electrically activated solenoid valve, whereby the pressure supply valve and the pressure relief valve act to prove and maintain pressure in the actuating cylinder when activated and interrupt the pressure supply and vent the actuating cylinder to the low pressure reservoir when deactivated.

8. The coupler of claim 7 wherein the low pressure reservoir is atmosphere surrounding the coupler and the pressure relief valve extends a polytetrafluoroethylene valve head against an anodized aluminum seat to close the relief line when activated.

9. The coupler of claim 8 wherein the pressure supply system supplies air at a pressure of approximately 200 pounds per square inch, the actuating cylinder is constructed to exert a force of approximately 1400 pounds against the actuator rod upon application of pressure of approximately 200 pounds per square inch to the pressure connection, and the pressure relief valve is sized and constructed to exert a force of approximately 40 pounds against the valve head when pressure of approximately 200 pounds per square inch is applied to the relief line.

10. A torque converter to driveline coupler comprising:
a main housing defining a pump chamber and a brake chamber;
a coupler shaft extending through the pump chamber and the brake chamber having a torque converter engagement section extending away from the main housing adjacent to the pump chamber and a driveline engagement section extending away from the brake chamber;
a fluid pump within the pump chamber that engages and is driven by a torque converter when the torque converter engages the torque converter engagement section of the coupler shaft and to supply fluid under pressure to the torque converter through a torque converter fluid supply passage;
a fast-release brake within the brake chamber having a brake drum rotatively affixed to the coupler shaft with a brake surface concentric with the coupler shaft and a resilient external brake band surrounding and closely spaced away from the brake surface constructed that circumerentially contracts engaging the brake surface on application of a force directed generally tangentially to the brake surface to an actuator engagement section of the brake band and is rotatively fixed to the main housing preventing rotation of the brake band in a rotational drive direction;
a brake actuating cylinder mounted to the main housing adjacent to the brake band having an actuator rod extending from the actuating cylinder and engaging the actuator engagement section of the brake band, and a pressure connection, the actuating cylinder is constructed to extend the actuator rod responsive to pressure applied to the pressure connection and retract the rod responsive to removal of pressure from the pressure connection; and a pressure supply system having a pressure supply, a pressure supply valve in a pressure supply line connecting the pressure supply and the pressure connection, a pressure relief valve in a relief line connecting the pressure connection and a low pressure reservoir whereby a driven torque converter engaging the torque converter engagement section of the coupler shaft is coupled to a driveline engaging the driveline engagement section of the coupler shaft, the driveline is prevented from being driven by simultaneously opening the pressure supply valve and closing the pressure relief valve providing pressure to the actuating cylinder, and the driveline is released by closing the pressure supply valve and opening the pressure relief valve allowing pressure within the cylinder to vent to the low pressure reservoir and the actuator rod to retract.

11. The torque converter to driveline coupler of claim 10 wherein the pressure supply provides pressurized air.

12. The torque converter to driveline coupler of claim 11 wherein the pressure supply valve is a normally closed electrically activated solenoid valve and the pressure relief valve is a normally open solenoid activated valve, whereby the pressure supply valve and the pressure relief valve act to provide and maintain pressure in the actuating cylinder when activated and interrupt the pressure supply and vent the actuating cylinder to the reservoir when deactivated.

13. The torque converter to driveline coupler of claim 12 wherein the low pressure reservoir is atmosphere surrounding the coupler and the pressure relief valve extends a polytetrafluoroethylene valve head against an anodized aluminum seat to close the relief line when activated.

14. The torque converter to driveline coupler of claim 13 wherein the pressure supply system supplies air at a pressure of approximately 200 pounds per square inch, the actuating cylinder is constructed to exert a force of approximately 1400 pounds against the actuator rod upon application of pressure of approximately 200 pounds per square inch to the pressure connection, and the pressure relief valve is sized and constructed to exert a force of approximately 40 pounds against the valve head when pressure of approximately 200 pounds per square inch is applied to the relief line.

15. The torque converter to driveline coupler of claim 14 further comprising a bell housing attached to the main housing adjacent to the pump chamber at a coupler mounting surface, the bell housing having an engine mounting surface spaced apart from the coupler mounting surface that conforms and is constructed to mount to an engine to which the torque converter is mounted and to position the coupler shaft to engage the torque converter to function as an output shaft of the toque converter.

* * * * *